(No Model.)
J. N. MORGAN.
FARM GATE.
No. 467,950.  Patented Feb. 2, 1892.
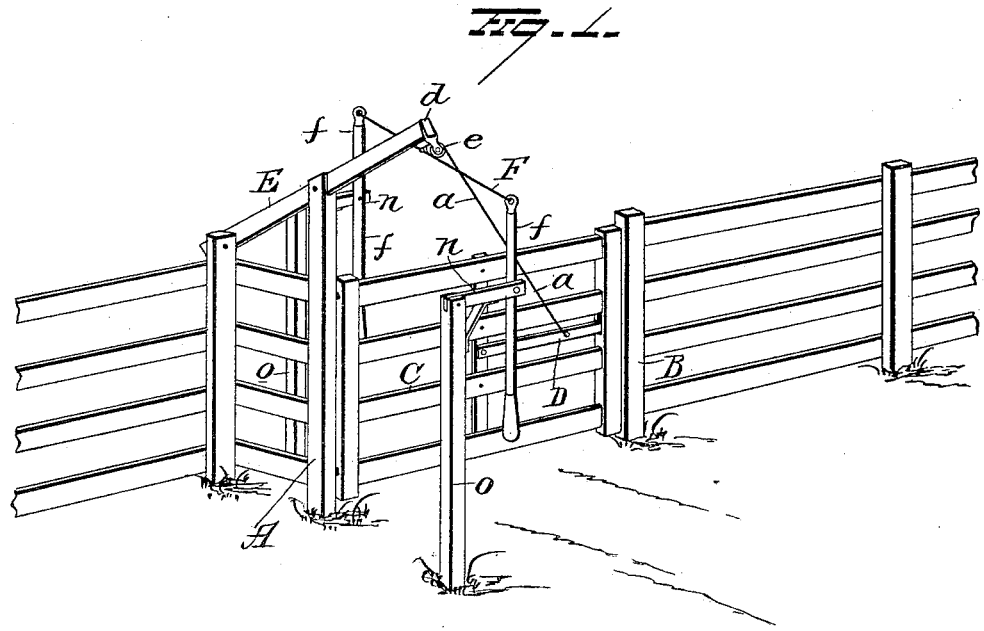
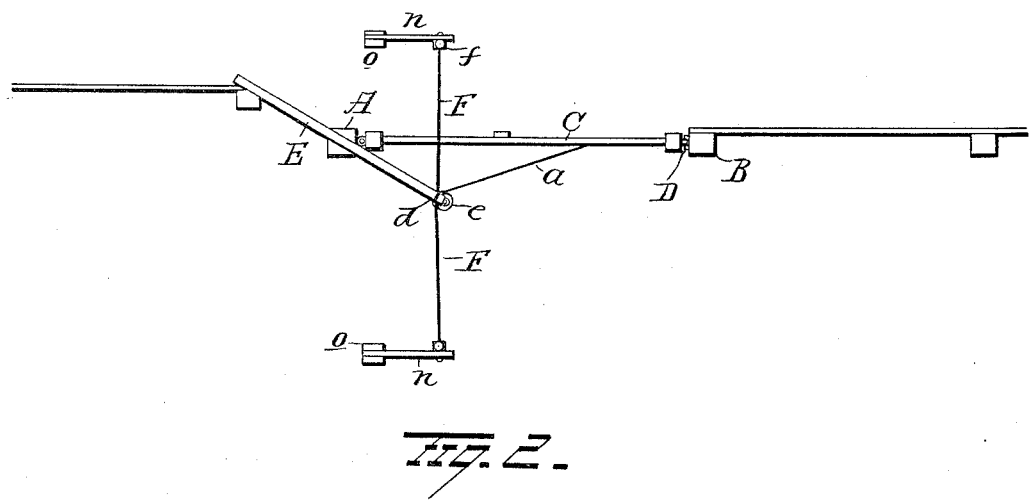
Witnesses
E. J. Nottingham
V. E. Hodges.
Inventor
J. N. Morgan
By H. A. Sympson
Attorney

UNITED STATES PATENT OFFICE.

JOSEPH N. MORGAN, OF WALLACE, INDIANA.

FARM-GATE.

SPECIFICATION forming part of Letters Patent No. 467,950, dated February 2, 1892.

Application filed July 14, 1891. Serial No. 399,521. (No model.)

*To all whom it may concern:*

Be it known that I, JOSEPH N. MORGAN, of Wallace, in the county of Fountain and State of Indiana, have invented certain new and useful Improvements in Farm-Gates; and I do hereby declare the following to be a full, clear, and exact description of the invention, such as will enable others skilled in the art to which it appertains to make and use the same.

My invention relates to an improvement in gates, and more particularly to that class of gates employed in farms, the object being to provide a gate which may be quickly opened and closed from some convenient position out of the reach of the gate as it swings back and forth; and it consists in certain novel features of construction and combinations of parts, as will be hereinafter described, and pointed out in the claim.

In the accompanying drawings, Figure 1 is a view showing the gate in position in a fence, and Fig. 2 is a plan view.

A represents a hinge-post; B, a latch-post, and C a gate hung to the former and provided with a latch D, adapted to engage the latch-post B in the usual manner.

The post A is conveniently of considerable height, and a brace E extends diagonally from a post in the fence to the top of the tall hinge-post. Not only is this brace or beam E diagonal, but the relative positions of the posts are such that the brace extends out laterally, as well as obliquely, so that its free end $d$ extends to one side of the line of the fence and gate, as shown in Fig. 2. To this outer or free end $d$ is suspended a pulley $e$, and a cable $a$, of rope, wire, chain, or similar flexible material, extends from the latch D of the gate up through this pulley and attaches to a cable F, which extends in opposite directions to the hand-levers $f\,f$, located at suitable distances apart to allow the gate to clear them when it swings outward in opening. These hand-levers are pivoted to arms $n\,n$ on the posts $o$, and by swinging them the gate is operated.

The advantages of placing the brace E as shown will be readily appreciated. In the first place it serves as a brace for the hinge-post A and prevents its getting loose and allowing the gate to sag; but of still greater importance is the fact that it directs the cable $a$ laterally, so that no matter from which end the cable F is pulled the gate will be swung toward the outer end $d$ of the brace E. In other words, if the gate is closed and cable F is pulled the latch will be raised and the gate will be swung open, and after it has swung out beyond the end $d$ of the arm a pull on the cable will of course close the gate or the gate can be arranged to swing shut automatically by gravity.

It is evident that slight changes might be resorted to in the form and arrangement of the several parts described without departure from the spirit and scope of my invention, and hence I do not wish to limit myself to the exact construction herein set forth; but, Having fully described my invention, what I claim as new, and desire to secure by Letters Patent, is—

The combination, with a fence one section whereof extends diagonally and a beam extending in the same vertical plane with the oblique section of the fence and secured to the upper ends of a short and a long post, said beam supporting a pulley at its outer end, of a gate, a cable extending from the gate-latch over the pulley on the beam, and operating-levers connected with said cable, substantially as set forth.

In testimony whereof I have signed this specification in the presence of two subscribing witnesses.

JOSEPH N. MORGAN.

Witnesses:
ALVA L. SPINNING,
W. H. SPINNING.